UNITED STATES PATENT OFFICE.

LOUIS LEFRANC, OF LAUSANNE, SWITZERLAND.

MANUFACTURE OF ARTIFICIAL STONE IN IMITATION OF MARBLE OR GRANITE AND THE LIKE.

No. 841,160. Specification of Letters Patent. Patented Jan. 15, 1907.

Application filed May 9, 1904. Serial No. 207,161.

*To all whom it may concern:*

Be it known that I, LOUIS LEFRANC, a citizen of the French Republic, residing at Lausanne, Switzerland, have invented certain new and useful Improvements in the Manufacture of Artificial Stone in Imitation of Marble or Granite and the Like, of which the following is a specification.

This invention relates to an improved process for the manufacture of artificial stone in imitation of marble, granite, and the like by fusing and casting a mixture comprising sulfate of lime and calcium fluorid.

The following description indicates, as an example, a method of carrying this improved process into effect. Into a suitable furnace, which allows of producing temperatures of approximately 1,300° centigrade and of effecting fusion on a hearth or in a crucible or the like, I place a homogeneous pulverized mixture comprising sulfate of lime and calcium fluorid, preferably in the proportions corresponding to the respective molecular weights—that is to say, in proportion of sixty-three to thirty-seven. The mass is heated till complete fusion has taken place and is stirred in order to produce homogeneousness with the temperature ranging from 1,000° centigrade to a maximum of 1,300° centigrade. As sulfate of lime only decomposes at a very high temperature, (about 1,800° centigrade,) while carbonate of lime employed in previous known processes decomposes at about 800° centigrade, the sulfate of lime may be melted without decomposition. It forms, with the fluorid, a double salt of peculiar crystallization, possessing great power of resistance and forming a stone which when cooled shows no cracks or flaws. After the fusing of the mass the latter is colored by suitable means.

For producing an imitation of marble, for instance, the mass can be colored while in a molten state by adding thereto at the time of casting colcothar or a salt of copper or other suitable coloring-matter, the mass being carefully stirred and then run into the mold. If colcothar (peroxid of iron) is used, the product is of a greenish-yellow color. Copper salts impart a bluish-gray tint to the mass.

The compound in a state of fusion is run into a mold having the shape of the article to be cast and is cooled very gradually without subjection to abrupt changes of temperature.

I claim as my invention—

1. The process of manufacturing an artificial stone resembling marble, granite or the like, consisting in fusing together, sulfate of lime, and calcium fluorid, these constituents being in proportions corresponding to their molecular weights, and casting the fluid mixture in molds.

2. The process of manufacturing an artificial stone resembling marble, granite or the like, consisting in fusing together sulfate of lime and calcium fluorid, these constituents being in proportions corresponding to their molecular weights and casting the fluid mixture in molds, the imitation marble being colored by addition of coloring-matter substantially as described.

In witness whereof I have signed this specification in the presence of two witnesses.

LOUIS LEFRANC.

Witnesses:
L. POCHON,
P. TISSOK.